US009341192B2

(12) United States Patent
Aiello et al.

(10) Patent No.: US 9,341,192 B2
(45) Date of Patent: May 17, 2016

(54) COMPACT FAN ASSEMBLY WITH THRUST BEARING

(71) Applicant: Apple Inc., Cupertino, CA (US)

(72) Inventors: Anthony Joseph Aiello, Santa Cruz, CA (US); Jesse T. Dybenko, Santa Cruz, CA (US); Brett W. Degner, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/061,682

(22) Filed: Oct. 23, 2013

(65) Prior Publication Data
US 2014/0049906 A1  Feb. 20, 2014

Related U.S. Application Data

(63) Continuation-in-part of application No. 13/238,488, filed on Sep. 21, 2011, now abandoned.

(60) Provisional application No. 61/449,510, filed on Mar. 4, 2011.

(51) Int. Cl.
*F04D 29/051*  (2006.01)
*G06F 1/20*  (2006.01)
(Continued)

(52) U.S. Cl.
CPC .............. *F04D 29/051* (2013.01); *F04D 17/16* (2013.01); *F04D 25/062* (2013.01); *F04D 29/0513* (2013.01); *F04D 29/281* (2013.01); *F04D 29/30* (2013.01); *F04D 29/668* (2013.01); *G06F 1/20* (2013.01); *G06F 1/203* (2013.01);
(Continued)

(58) Field of Classification Search
CPC ... F04D 25/062; F04D 29/0513; F04D 29/30; G06F 1/203; F16C 17/107
USPC .......................... 415/104, 105, 106, 107, 142
See application file for complete search history.

(56) References Cited

U.S. PATENT DOCUMENTS 5,982,064 A   11/1999  Umeda et al.
7,417,345 B2   8/2008  Chen et al.
(Continued)

FOREIGN PATENT DOCUMENTS

TW         200426312 A    12/2004

OTHER PUBLICATIONS

PCT Application No. PCT/US2012/026197—International Search Report & Written Opinion dated May 25, 2012.
(Continued)

*Primary Examiner* — Nathaniel Wiehe
*Assistant Examiner* — Jeffrey A Brownson
(74) *Attorney, Agent, or Firm* — Downey Brand LLP

(57) ABSTRACT

A fan assembly for a computing device is disclosed. The fan assembly can include an impeller having a number of blades and a motor for turning the blades. The motor can turn the blades via a magnetic interaction between the impeller and the motor. A fluid dynamic thrust bearing can be used to control a position of the impeller relative to the motor. In particular, the impeller can be configured to rotate around an axis and the thrust bearing can be used to control movement of the impeller in a direction aligned with the rotational axis. In one embodiment, the thrust bearing can be configured to stabilize the impeller when vibratory forces act upon the fan assembly. More particularly, parameters associated with the thrust bearing can be selected to counteract vibratory forces emitted by a speaker system.

13 Claims, 13 Drawing Sheets

(51) Int. Cl.
| | |
|---|---|
| *F04D 25/06* | (2006.01) |
| *F04D 29/30* | (2006.01) |
| *F04D 17/16* | (2006.01) |
| *F04D 29/28* | (2006.01) |
| *F04D 29/66* | (2006.01) |
| *H02K 5/167* | (2006.01) |
| *H02K 7/14* | (2006.01) |
| *F16C 17/10* | (2006.01) |
| *F16C 17/04* | (2006.01) |
| *H02K 21/22* | (2006.01) |
| *H02K 7/09* | (2006.01) |

(52) U.S. Cl.
CPC ............... *H02K 5/1675* (2013.01); *H02K 7/14* (2013.01); *F16C 17/045* (2013.01); *F16C 17/107* (2013.01); *H02K 7/09* (2013.01); *H02K 21/22* (2013.01); *H02K 2205/03* (2013.01)

(56) References Cited

U.S. PATENT DOCUMENTS

| | | | |
|---|---|---|---|
| 7,732,956 B2* | 6/2010 | Mochida et al. | 310/67 R |
| 7,775,719 B2 | 8/2010 | Shishido et al. | |
| 7,855,882 B2 | 12/2010 | Franz | |
| 7,903,406 B2 | 3/2011 | Takemoto | |
| 8,807,271 B2* | 8/2014 | Chen et al. | 181/199 |
| 2004/0145260 A1* | 7/2004 | Tamaoka et al. | 310/90 |
| 2005/0163404 A1* | 7/2005 | Shishido et al. | 384/100 |
| 2009/0257883 A1* | 10/2009 | Hwang et al. | 416/243 |
| 2010/0080719 A1* | 4/2010 | Boggess et al. | 417/423.14 |
| 2010/0096112 A1* | 4/2010 | Zha et al. | 165/121 |
| 2014/0212303 A1* | 7/2014 | Tamaoka et al. | 417/354 |

OTHER PUBLICATIONS

Taiwanese Patent application No. 101106530—Office Action dated Nov. 27, 2015.

* cited by examiner

COMPACT FAN ASSEMBLY WITH THRUST BEARING

CROSS-REFERENCE TO RELATED APPLICATION

This is a continuation-in-part of and claims priority to and the benefit under 35 U.S.C. 120 of co-pending U.S. patent application Ser. No. 13/238,488, filed Sep. 21, 2011, entitled "COMPACT FAN ASSEMBLY WITH THRUST BEARING," which claims priority to U.S. Provisional Application No. 61/449,510 filed Mar. 4, 2011 entitled "COMPACT FAN ASSEMBLY WITH THRUST BEARING" the entire disclosures of which are hereby incorporated by reference.

BACKGROUND

1. Field of the Described Embodiments

The described embodiments relate generally to computing devices such as desktop computers, laptop computers and the like. More particularly, thermal regulation systems including fans for computing devices are described.

2. Description of the Related Art

Computing devices, such as laptops, include internal components, such as processors, that generate heat. The heat generated by the internal components can cause the internal temperature of the device to rise. Often, to prevent over temperature conditions in the computing device that can damage or shorten its operational lifetime, a thermal regulation system can be included. In some instances, the thermal regulation system can utilize fans to affect the internal airflow within and through the device and hence the internal temperature distribution.

Modern computing devices, such as laptop devices, can be very compact with a very limited amount space available for packaging the various device components. Thus, minimally sized components that perform their intended function with a maximum amount of efficiency are desired. In view of the foregoing, there is a need for methods and apparatus associated with fan configurations that can be utilized in a compact computing device.

SUMMARY

This paper describes various embodiments that relate to a fan assembly, including a thrust bearing suitable for use with a computer device having a vibration source.

In one embodiment, a computer system is disclosed. The computer system includes at least the following components: an enclosure; a vibration source disposed within the enclosure; and a cooling assembly disposed within the enclosure. The cooling assembly includes at least the following: a housing, and a rotational fan assembly disposed within the housing. The rotational fan assembly includes a thrust bearing having at least one grooved fluid dynamic bearing. The thrust bearing is configured to limit relative axial motion between the rotational fan assembly and the housing.

In another embodiment, a blower assembly suitable for operation in proximity to a vibration source is disclosed. The blower assembly includes at least the following: a housing including an inlet for receiving air, and an outlet for expelling the air; and a rotational fan assembly. The rotational fan assembly includes an impeller having a plurality of fan blades, and a shaft having a first end coupled to a central portion of the impeller, and a dual-thrust bearing having at least two grooved fluid dynamic bearings acting in opposite directions. The dual-thrust bearing is configured to limit relative axial motion between the impeller and the housing during operation of the blower assembly.

In yet another embodiment, a fan assembly configured to operate quietly in proximity to a vibration source is disclosed. The fan assembly includes at least the following: a housing including an inlet for receiving air, and an outlet for expelling the air; an impeller mounted within the housing and configured to rotate around an axis, the impeller including a shaft extending from a central portion of the impeller; a sleeve bearing surrounding the shaft; and an axial control mechanism comprising at least two grooved fluid dynamic bearings acting in opposite directions, the axial control mechanism configured to limit relative axial motion between the impeller and the housing.

In still another embodiment, a cooling fan assembly suited for operating in close proximity to a source of vibration is disclosed. The cooling fan assembly includes at least a fan housing; an impeller having a number of fan blades disposed within the fan housing; a magnetically preloaded single-thrust bearing having a grooved fluid dynamic bearing acting in an opposite axial direction to the magnetic preload, where the single-thrust bearing is configured to limit axial motion between the impeller and the fan housing during operation of the cooling fan assembly; and a shaft having a first end coupled to a central portion of the impeller. The shaft is coupled to a member engaged with the magnetically preloaded single-thrust bearing.

BRIEF DESCRIPTION OF THE DRAWINGS

The embodiments will be readily understood by the following detailed description in conjunction with the accompanying drawings, wherein like reference numerals designate like structural elements, and in which.

DESCRIBED EMBODIMENTS

Figures 1A, 1B:
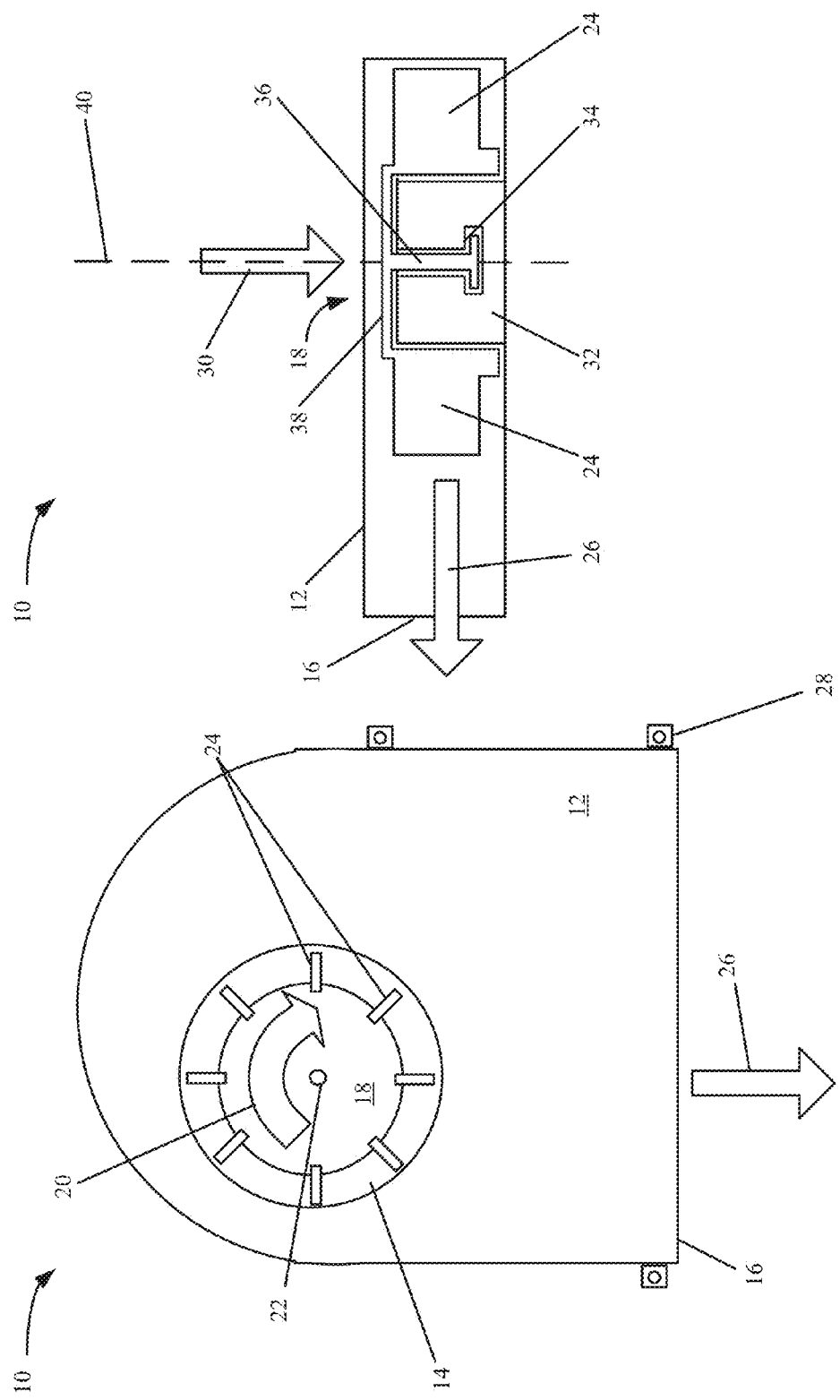
FIG. 1A shows a top view of a fan assembly in accordance with the described embodiments.
FIG. 1B shows a side view of a fan assembly in accordance with the described embodiments.

In the following paper, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

A centrifugal fan assembly is described. The fan assembly can be used as part of a thermal regulation system in a computing device, such as a laptop computer. The fan assembly can be compact and efficient allowing it to be used in a laptop with a relatively thin housing. The fan assembly can include an impeller coupled to a thrust bearing. The thrust bearing can be used to improve the magnetic alignment between the impeller and a motor such that the motor can more efficiently impart rotational energy to the impeller and contact friction between the shaft and the bearing can be reduced as compared to the use of a sleeve bearing. The reduced friction can decrease lubrication requirements and extend the lifetime of the part. In addition, the thrust bearing can be used to minimize axial motions of the impeller potentially reducing vibration and noise.

In one embodiment, the thrust bearing can enable the use of 3-D blade shapes that generate lift. With the sleeve bearing, the lift can pull the impeller out of its bearing and into contact with the fan cover. The thrust bearing can prevent this type of motion and allow 3-D blade shapes that are more aerodynamically efficient to be used such that the overall fan aerodynamic performance is improved. The fan assembly can be disposed within a housing associated with the laptop computer, such as the housing including the main logic board. The laptop computer can include a thermal regulation system that helps to maintain an internal temperature of the laptop within a desired temperature range. The fan assembly can be a component of the thermal regulation system. A logic device within the housing, such as a processor on the main logic board, can be configured to control a rotational velocity of the fan. The rotational velocity of the fan can be adjusted to affect the fan assembly properties, such as an airflow rate through the fan assembly. Based on internal sensor data, such as internal temperature data, the rotational velocity can be selected as a function of time to meet a particular thermal regulation objective, such as a desired thermal cooling effect.

A design objective for the laptop can be to minimize the thickness of the housing. An advantage of using a thrust bearing in the fan assembly is that it allows additional positional control over the rotatable fan components in the fan, such as an impeller, as compared to a sleeve bearing. For instance, the thrust bearing can be configured to control motions of the impeller along the axis of rotation of the impeller. The additional positional control may allow spacing tolerances, such as the spacing tolerance between the impeller blades and the surrounding fan assembly housing to be reduced. The reduced spacing tolerances can allow for a fan assembly enclosure that is thinner and more compact than a fan assembly enclosure that includes an impeller using a sleeve bearing. The thinner and more compact fan assembly enclosure may allow the thickness of the laptop housing to be reduced.

The axial positional control provided by a thrust bearing can have other advantages. With a sleeve bearing, which does not provide axial position control, the impeller in the fan can move up in the axial direction, which can create vibrations and generate noise. An advantage of the impeller coupled to a thrust bearing is that the axial motion of the impeller can be controlled to reduce vibrations and associated noise caused by axial motions. Further, the axial motion control provided by the thrust bearing can help to prevent movements that result in undesired contacts between components, such as between the impeller and the fan assembly housing or between the impeller shaft and the thrust bearing. The undesired contact can cause impeller stalling and wear on the fan components including wear on the bearing. As an example, the axial motion control provided by the thrust bearing can prevent part contact resulting from a system shock such as when a laptop including the fan assembly is dropped.

In one embodiment, the impeller can include magnets that are aligned with magnets in a motor to impart a rotational velocity to the impeller. With a sleeve bearing, the magnets in the impeller can be aligned with the magnets in the motor such that a downward magnetic force is generated in the axial direction. The downward magnetic force can provide a pre-load that axially holds the impeller in place. A disadvantage of pre-loading the impeller in this manner is that it causes the motor to less efficiently transfer rotational velocity to the impeller. Further, the magnetic pre-load can press an impeller shaft into a bottom of the sleeve bearing. The magnetic pre-load force of the impeller shaft against the sleeve bearing can generate friction that increases wear on the shaft and the sleeve bearing, increases power requirements and increases lubrication requirements.

With a thrust bearing coupled to the impeller, the motor and the impeller magnets can be aligned such that the magnetic pre-load is essentially eliminated since the thrust bearing provides axial positional control. The better alignment between the motor and impeller magnets allows the impeller to be driven more efficiently by the motor. Further, the elimination of the magnetic pre-load can reduce the friction between the impeller shaft and the bearing. The reduced friction can lessen lubrication requirements and frictional power losses. Thus, the removal of the pre-load can allow the impeller and motor system to operate more efficiently, potentially reducing the power required to drive the impeller or allowing the impeller to be driven at a higher velocity for a given power output.

Another advantage of using a thrust bearing is that 2-D or 3-D shaped blades on the impeller can be used. In a 2-D blade, a change in shape of the blades in the axial direction of rotation can be minimal. With a 2-D blade configuration, the forces generated on the impeller in the axial direction are small. With a 3-D shaped blade, the shape of the blade in the axial direction can be varied. The 3-D shape can be selected to meet different objectives, such as to increase the flow rate through the fan or to make the fan more efficient. The 3-D shape can cause aerodynamic forces in the axial direction, such as lift, that can pull an impeller out of its bearing when a sleeve bearing is used. Thus, 3-D shaped blades are typically undesirable for use with sleeve bearings. The axial movement control provided by a thrust bearing can prevent axial motion resulting from aerodynamic forces enabling 3-D blades to be used on the impeller.

In particular embodiments, the fan assembly can include an impeller having a number of blades and a motor for turning the blades. In a particular embodiment, the motor can be configured to generate a rotating magnetic field that can be used to rotate the impeller via magnets installed in the impeller. A thrust bearing can be used to keep the impeller within a desired positional range relative to the motor. The thrust bearing can include a fluid filled reservoir. The impeller can include a shaft, including a thrust plate, which extends into the fluid filled reservoir. Forces exerted by the fluid in the fluid reservoir on the shaft including the thrust plate can help to control a position of the impeller relative to the motor as well as to the surrounding housing. In one embodiment, the impeller can include a central hub where the shaft, the thrust bearing and the motor can be disposed within a hollow interior portion of the central hub. In another embodiment, the thrust bearing and the motor can be provided as an integrated component. One advantage of a thrust plate is that it can distribute forces, such as a force resulting from a shock to the laptop including the assembly over a wider area. The capability to distribute the force over a wider area makes the thrust bearing more shock resistant and hence the fan assembly is more robust as compared to an embodiment in which a sleeve bearing is used in conjunction with a magnetic preload.

When a shaft for the impeller and the bearing are disposed within a central hub, another advantage of a thrust bearing over a sleeve bearing is a potential reduction in the shaft length. In a sleeve bearing, since no axial positional control is provided, the impeller shaft typically needs to be longer to ensure stability of the impeller as compared to an impeller shaft used with a thrust bearing. A longer impeller shaft can require more lubrication, since the surface area of the shaft is increased, and raise the height of the central hub. As the height of the central hub is raised, aerodynamic performance can be decreased because the central hub can block the airflow into the fan assembly. Further, when the height of the central hub is increased, the overall thickness of the fan assembly can be increased.

The axial positional control afforded by a thrust bearing can allow the impeller shaft to be shortened while maintaining impeller stability. With the impeller shaft shortened, it may be possible to lower the central hub height, which can be used to improve aerodynamic performance of the fan, such as the airflow through the fan. Further, it may be possible to reduce the overall thickness of the fan assembly.

In one embodiment, the fan assembly can be configured as a centrifugal fan. The centrifugal fan can include the impeller mounted within a housing. The impeller can be configured to rotate around an axis such that air is drawn into the housing via an inlet and then expelled from the housing via an outlet. The impeller blades can be shaped to improve airflow through the fan and reduce the noise generated by the fan. Impeller blades shaped in this manner can generate aerodynamic forces such as lift. The thrust bearing can be configured to control a displacement of the impeller in a direction aligned with the axis of rotation resulting from aerodynamic forces generated by the blades. In a particular embodiment, the displacement control provided by the thrust bearing may help the magnets in the impeller to remain optimally aligned with the magnets in the motor.

In particular, with respect to FIGS. 1A and 1B, a fan assembly having a housing including an inlet for receiving air and outlet for expelling air is described. The fan assembly can include an impeller coupled to a motor via a thrust bearing. The impeller, motor and the thrust bearing can be disposed within the housing. The impeller can include a plurality of blades. The blades can be shaped to improve airflow and noise characteristics associated with the fan assembly. Blade shapes and impeller configurations are described with respect to FIGS. 2A-4C. With respect to FIGS. 5, 6A and 6B, the thrust bearing interface including the effects of blade shape on the thrust-bearing interface are discussed. With respect to FIG. 6D, the effect of blade shape on the fan performance is discussed. In particular, a comparison of performance between 2-D and 3-D blade shapes is shown.

FIGS. 1A and 1B show top and side views of a fan assembly 10. The fan assembly 10 includes a housing 12 with an inlet 14 and an outlet 16. The housing 12 can include a number of attachment points that can allow the fan assembly 10 to be secured. For instance, the fan assembly 10 can be secured within a computing device such as a laptop computer. In one embodiment, the fan assembly 10 can be part of a thermal regulation system associated with the computing device where operation of the fan can help to maintain an internal temperature of the computing device within a desired temperature range.

An impeller 18 with a plurality of blades can be disposed within the housing 12. The fan assembly 10 can be configured such that a rotation of the impeller 18 causes air 30 to be drawn within the housing 10 via the inlet 14. The impeller 18 can impart momentum to the air such that air 26 is expelled out of the outlet 16. The impeller 18 can be configured to rotate about an axis 40 that passes through a point 22 in the center of the impeller. The rotational direction of the impeller 18 is indicated by the arrow 20, which in this example indicates the impeller 18 can rotate in a clockwise direction. In other embodiments, an impeller 18 can be configured to rotate in a counter clockwise direction or in both a clockwise and a counter clockwise direction.

The impeller 18 can include a number of blades 24. In one embodiment, blades 24 can be attached to and extend from a hub portion 38 of the impeller 18. In other embodiments, blades 24 may not be directly attached to the hub (e.g., see FIG. 4C). A shape of blades 24 and a rotation rate of the impeller 18 can affect the mass flow rate of air passing through the fan assembly and how efficiently the air is moved through the fan assembly 10. As shown, a portion of the blades 24 is visible through the inlet 14. A shape of the blades near the inlet 14, such as a portion of the blades visible through the inlet, can affect how air is drawn into the inlet. Details of blade shape and the effects of blade shape are described in more detail with respect to FIGS. 2A-4C.

A motor 32 can be used to impart a rotational motion to the impeller 18. In one embodiment, a portion of the hub 38 can be hollow to allow all or a portion of a motor to fit within the hub 38. In one embodiment, the motor 32 can be configured to generate a rotating magnetic field that can cause the impeller 18 to rotate via a magnetic interaction between magnets placed in the impeller 18 and the rotating magnetic field generated by the motor 32. A power source can be coupled to the motor 32. The motor 32 can convert the power received from the power source into the rotational magnetic field that is used to drive the impeller 18.

The motor 32 can include a controller (not shown) that allows a rotational rate of the magnetic field generated by the motor and hence a rotational rate of the impeller 18 to be controlled. In one embodiment, the controller can be configured to adjust the rotational rate of the generated magnetic field in response to commands received from a processor associated with a computational device in which the fan assembly is installed. The motor 32 can include one or more sensors that allow a rotational rate of the impeller 18 and/or a status of the motor to be determined. The controller can be configured to communicate information regarding the motor status and the rotational rate of the impeller to the remote processor.

The impeller 18 can include a shaft 36 that extends from the hub 38. The shaft 36 can be coupled to a bearing 34. The bearing 34 can be used to stabilize a position of the impeller 18 relative to the motor 32 during operation of the fan 10. In one embodiment, the bearing 34 can be integrated into the motor 32.

In a particular embodiment, portions of the shaft 36 extending from the hub 38 into the bearing 34 can be of different diameters. For instance, the shaft 36 can include a first portion with a first diameter and a second portion with a second diameter where the second diameter is greater than the first diameter. The second portion with a second diameter can be referred to as a thrust plate. In FIG. 1B, the second portion with the second diameter is shown disposed at the end of first portion with the first diameter. In other embodiments, the second portion can be disposed at a middle portion of shaft 36 such that the shaft consists of a first portion with a first diameter, a second portion with a second diameter and then a third portion extending from the second portion with the first diameter. Many different types of shaft designs with portions including different diameters are possible and the example provided in FIG. 1B is for the purposes of illustration only.

In one embodiment, the bearing 34 can be a thrust bearing and the shaft 36 can be shaped such that it is compatible with the thrust bearing. For instance, as shown, the shaft 36 can include portions with different diameters. The interface between the shaft 36 and thrust bearing can be used to affect a motion of the impeller 18 relative to the thrust bearing, including a motion in the direction of axis 40 as well as off-axis motions. As will be described in more detail below (e.g., see FIGS. 5 and 6), control of motion in the direction of axis 40 can be desirable because the blades, such as 24, can be shaped such that an aerodynamic force aligned with axis 40 is generated. For instance, aerodynamic lift can be generated that can cause the impeller 18 to move upwards relative to the thrust bearing 34 and the motor 32.

Figure 2A:
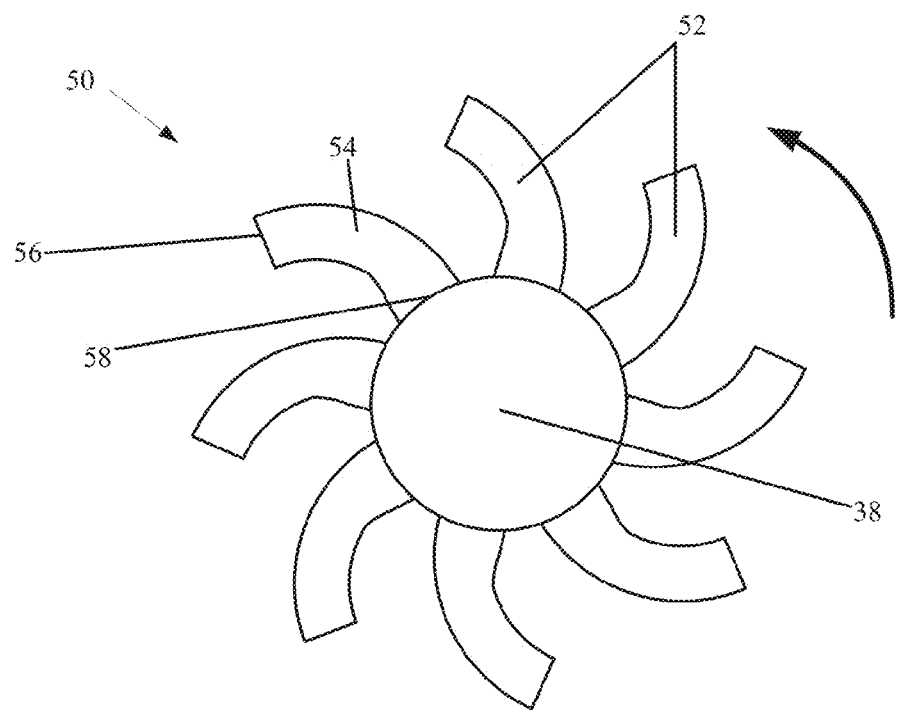
FIGS. 2A and 2B show top views of impellers in accordance with the described embodiments.
Figure 2B:
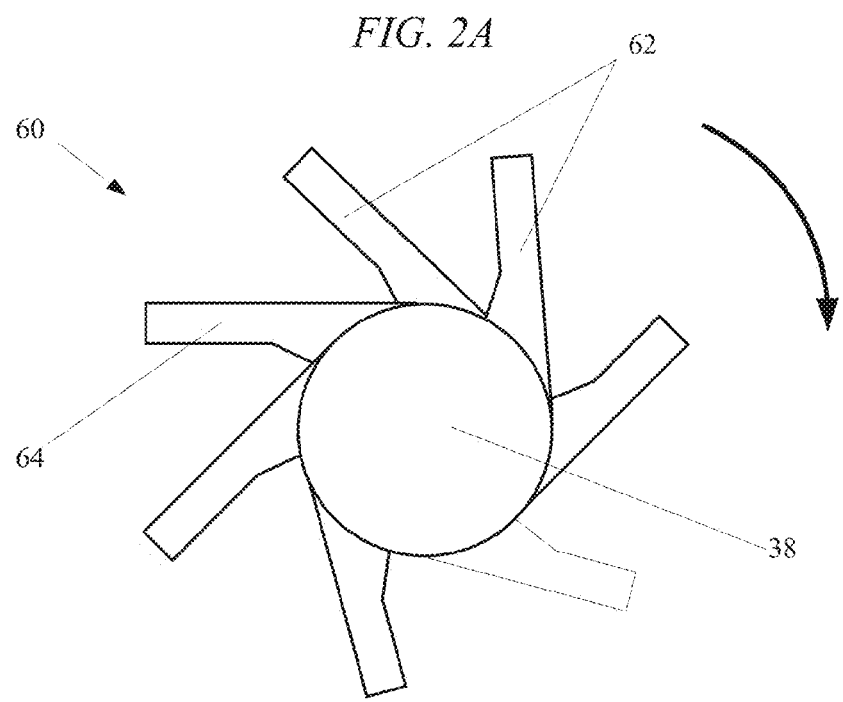

FIGS. 2A and 2B show top views of impellers 50 and 60. Each impeller can include a number of blades and hub 38. The diameter of the hub 38 can be varied. In addition, the number of blades on each impeller can be varied. For instance, impeller 50 includes 8 blades, such as 52, and impeller 60 includes 6 blades, such as 62. In one embodiment, each blade can be identical and the spacing between each blade can be similar. In other embodiments, on a single impeller, the shape of each blade can vary from blade to blade and the spacing between the blades can be varied. In one embodiment, the spacing between blades can be varied to affect the acoustic properties of the fan.

Each blade can include a root, such as 58, a tip, such as 56, and a planform, such as 54 and 56. The thickness across the planform can vary from the root to the tip. For instance, for blades 52, the planform 54 is thicker at the root 58 than at the tip 56. Further, the planform can vary from blade to blade depending on the impeller design. For instance, blades 52 include a planform 54 that is straighter as compared to a planform 64 for blades 62.

Figure 3A:
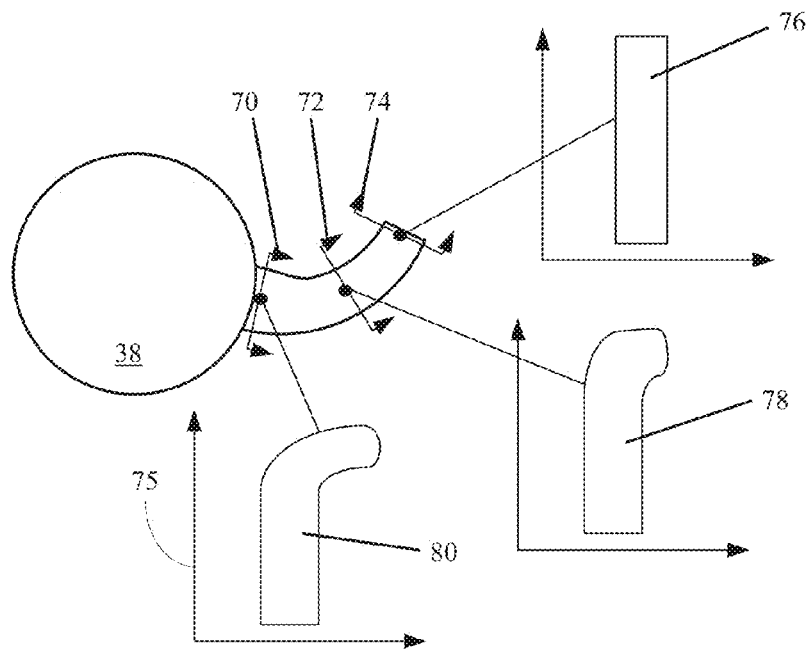
FIGS. 3A and 3B show top views and cross-sections of impeller blades in accordance with the described embodiments.
Figure 3B:
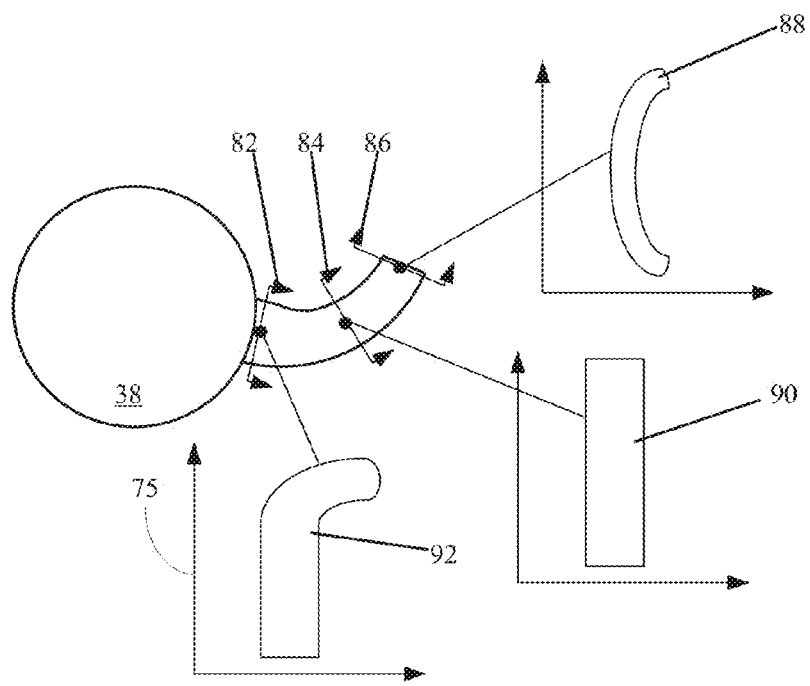

FIGS. 3A and 3B show top views and cross-sections of impeller blades. In each figure, a single blade is shown attached to a hub 38. Three cross-sections in the direction of the axis of rotation are shown for each blade. In FIG. 3A, it can be seen that near the root 70, the cross-sectional shape 80 is curved near the top and then progresses into a constant cross-sectional shape near the bottom where the cross-section is no longer changing in the axial direction 75. In the middle of the blade 72, the cross-sectional shape 78 is less curved near the top as compared to the cross-sectional shape 80 by the root 70. Near the tip 74, the cross sectional shape 76 does not change in the axial direction. In particular embodiments, the blades can be shaped such that there is a smooth and continuous transition from cross-section to cross-section. In other embodiments, blades can be shaped with discontinuous transitions.

In FIG. 3B, near the root 82 of the blade, the cross section shape 92 is curved near the top and then progresses into a more constant cross-sectional shape in the axial direction. Near the middle 84 of the blade, the cross-sectional shape 90 is proximately constant in the axial direction. Near the tip 86 of the blade, the cross-section is "C" shaped.

The blades can be shaped to affect different performance characteristics of a fan in which they are installed. For instance, a cross-sectional shape, such as 80 or 92, can affect the air flow rate of the fan. As another example, a cross section shape, such as 88, can affect an acoustic property of the fan, such as reducing the amount of noise generated by the fan. The amount of noise can be reduced by spreading out the pressure wave that forms at the tip of the blade.

Figure 4A:
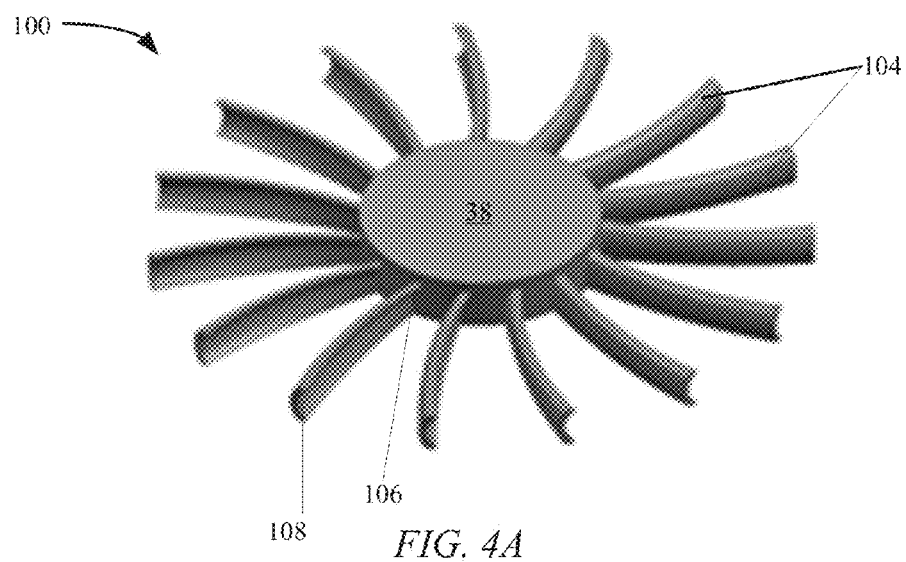
FIGS. 4A-4C show perspective views of impellers in accordance with the described embodiments.
Figure 4B:
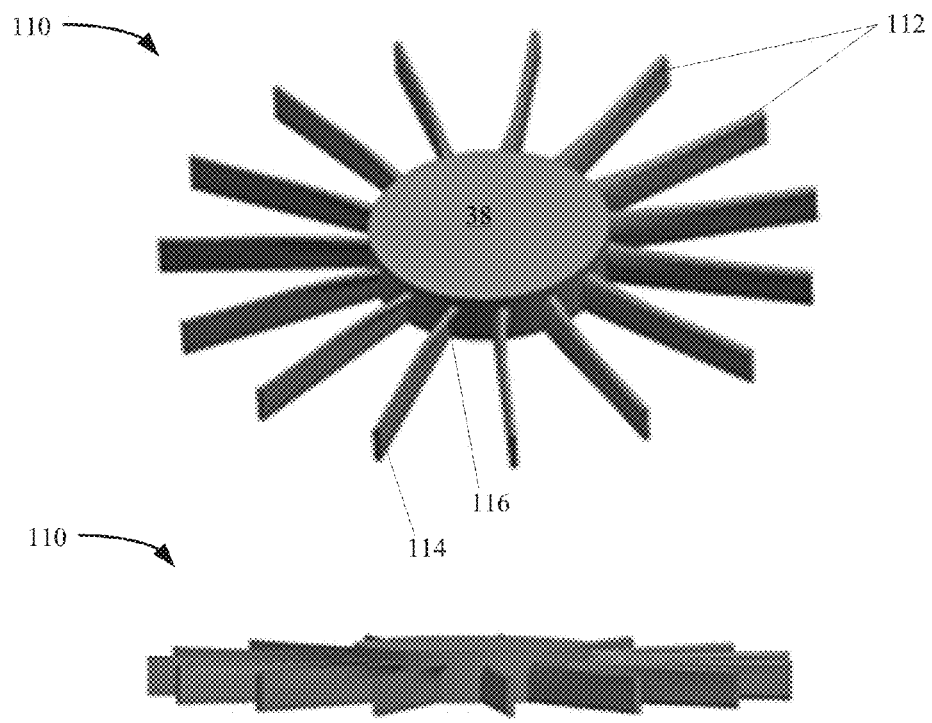
Figure 4C:
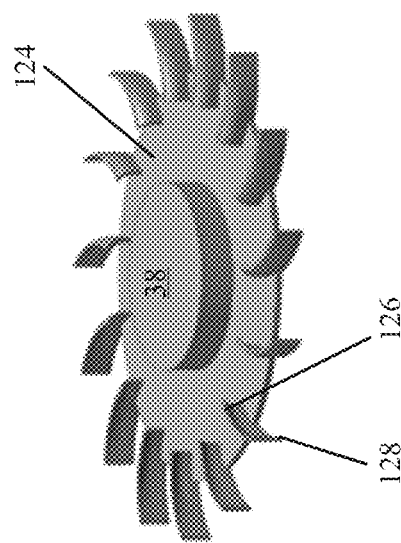
Figure 4C:
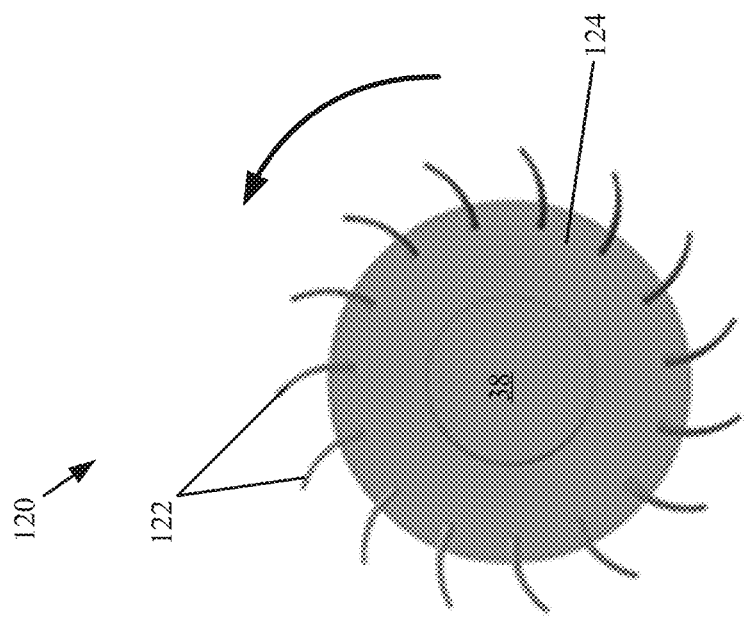

FIGS. 4A-4C show perspective views of impellers in accordance with the described embodiments. In FIG. 4A, an impeller 100 includes a hub 38 and blades 104. The blades 104 are curved near the root 106 such that a "C" shape is formed. The "C" shape is propagated up the length of the blade from the root 106 to the tip 108. At the tip 108, the blades are flat and the "C" shape profile is visible. In FIG. 4B, the blades 112 for impeller 110 are straighter as compared to the blades 104 in FIG. 4A. The blades 112 are curved near the root 116 such that the cross-sectional shape is changing in the axial direction. Near the tip 114 of the blade, the cross-sectional shape is substantially constant in the axial direction.

In FIGS. 4A and 4B, the root of each of the blades on the impellers, 100 and 110, are attached to a hub 38. In other embodiments, as shown in FIG. 4C, the blades, such as 122, can be attached to a disk 124 that extends from the hub 38 on impeller 120. In this embodiment, there is a space between the root 126 of the blades 122 and the side of the hub 38. The tip 128 of each of the blades 122 extends beyond an edge of the disk 124. In other embodiments, the edge of the disk 124 can extend to the tip 128 or beyond the tip 128 of each of the blades 122.

Figure 5:
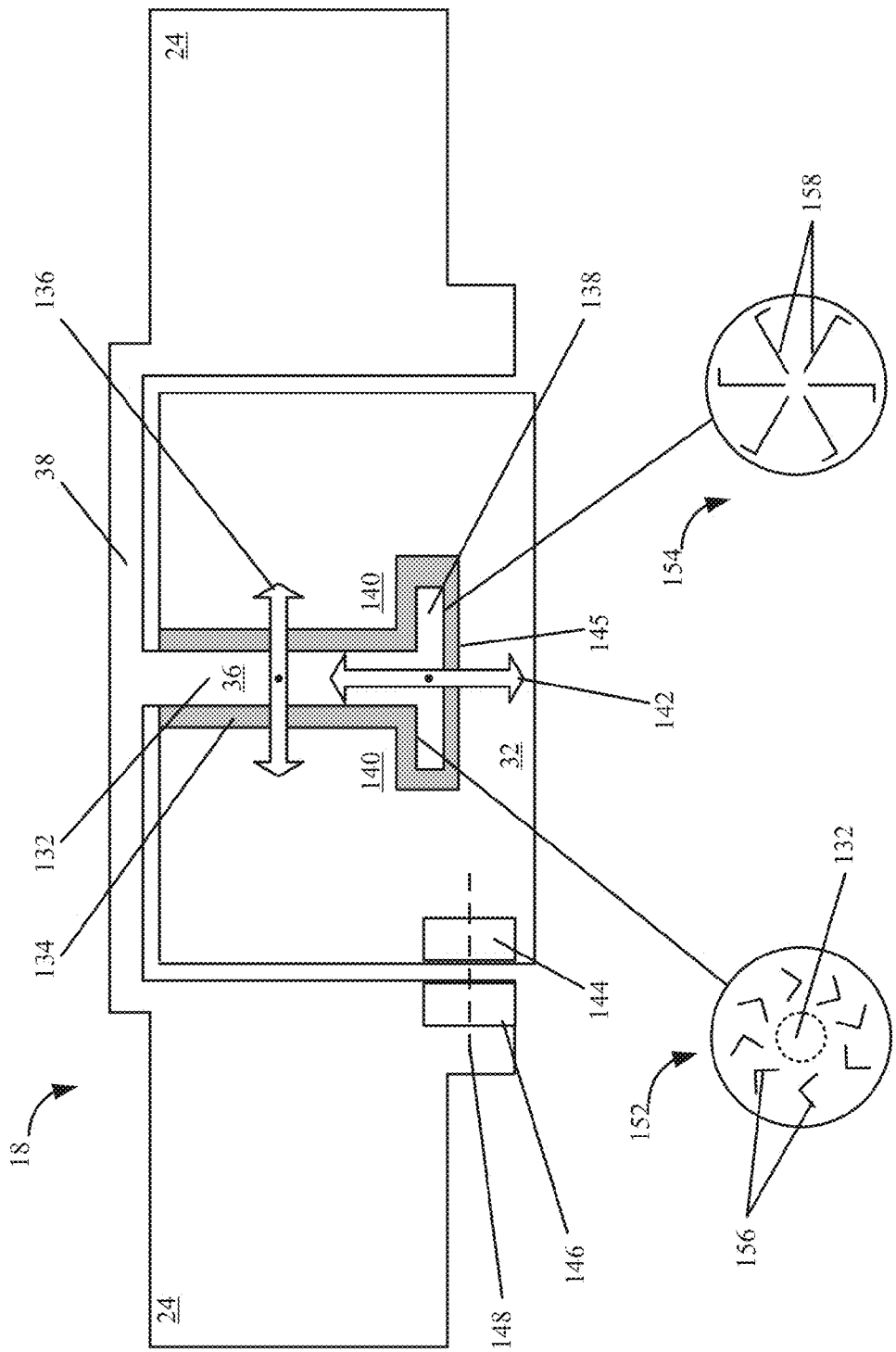
FIG. 5 shows a side view of an impeller and motor, including a thrust bearing in accordance with the described embodiments.

FIG. 5 shows a side view of an impeller 18 and motor 32 including a thrust-bearing interface 140. A shaft 36 can extend from the impeller 18 and into an interior of the thrust bearing 140. The shaft 36 can include a first portion 132 and a second portion 138. In one embodiment, the second portion 138 can be proximately disk shaped with a diameter that is greater than the first portion. The second portion 138 can be referred to as a thrust plate.

During operation of the fan assembly including impeller 18 and motor 32, the shaft 36 can experience radial forces 136 and/or axial forces 142. For instance, an upward or downward axial force can result from an aerodynamic force that is generated by the blades 24 when the impeller rotates. Whether the aerodynamic force is directed upward or downward can depend on a shape of the blades 24 that extend from hub 38 and the rotational direction of the impeller 18. The aerodynamic force, as is described in more detail with respect to FIG. 6B can vary according to the rotational speed of the impeller 18. The forces, 136 and 142, can affect a position of the shaft 36 relative to the thrust bearing 140. A radial force 136 might cause the shaft 36 to move closer to one side of the thrust bearing 140, whereas, an axial force 142 might cause the shaft 36 to move closer to a bottom 145 of the thrust bearing 140 or away from the bottom 145 of the thrust bearing 140.

The thrust bearing 140 can include a sealed fluid filled reservoir 134 that surrounds the shaft. During operation, the fluid filled reservoir 134 can exert a force on the shaft 36. In one embodiment, the force exerted on the shaft 36 can be affected by parameters, such as the properties of the fluid in the reservoir, the rotation rate of the shaft 36, a surface geometry of the shaft and/or the cavity of the thrust bearing surrounding the shaft 36 and the distance between each portion of the shaft and the cavity of the thrust bearing. The parameters can be selected such that the forces exerted on the shaft keep the position of the impeller 18 relative to the thrust bearing 140 within some desired range during operation of the fan assembly.

As an example, as described above, the impeller 18 includes magnetic components, such as 146, that are configured to interact with magnetic components, such as 144, associated with a motor 32 where the motor via its magnetic components can be used to impart a rotational velocity to the impeller 18. For optimal operation of the motor 32 and the impeller 18 and to prevent collisions between components that can result in undesirable component wear or damage, it may be desirable for the magnetic components to remain relatively aligned with one another. For instance, maintaining the magnetic components 144 and 146 to remain relatively centered with one another around line 148 may improve the efficiency of the system while preventing wear resulting from the impeller 18 colliding with the motor 32 or a housing associated with the fan assembly.

As described above, the surface geometry of the shaft and/or the cavity can affect the forces exerted on the shaft 36 by the fluid within the thrust bearing 140. The surface of the cavity associated with the thrust bearing 140 and/or the surface of the shaft 36 can include grooves that affect the forces exerted by fluid on the shaft 36. The grooves can be arranged in different geometrical patterns, of which spiral and herringbone patterns are the most common. As an example, a top surface 152 of the thrust plate 138 of the shaft 36 is shown with a first geometrical pattern 156 while a bottom surface 154 of the thrust plate 138 is shown with a second geometrical pattern 158.

To better illustrate the effects of the geometrical patterns as well as the other parameters described above on the force exerted by the fluid 134 in the thrust bearing 140, for the purposes of discussion with respect to FIGS. 6A and 6B as follows, the force that the fluid exerts on the shaft 36 can be viewed as a spring where the geometrical patterns have an effect on the spring constant of the spring. In particular, the geometrical patterns can be selected to affect a "stiffness" generated in the fluid.

Figure 6A:
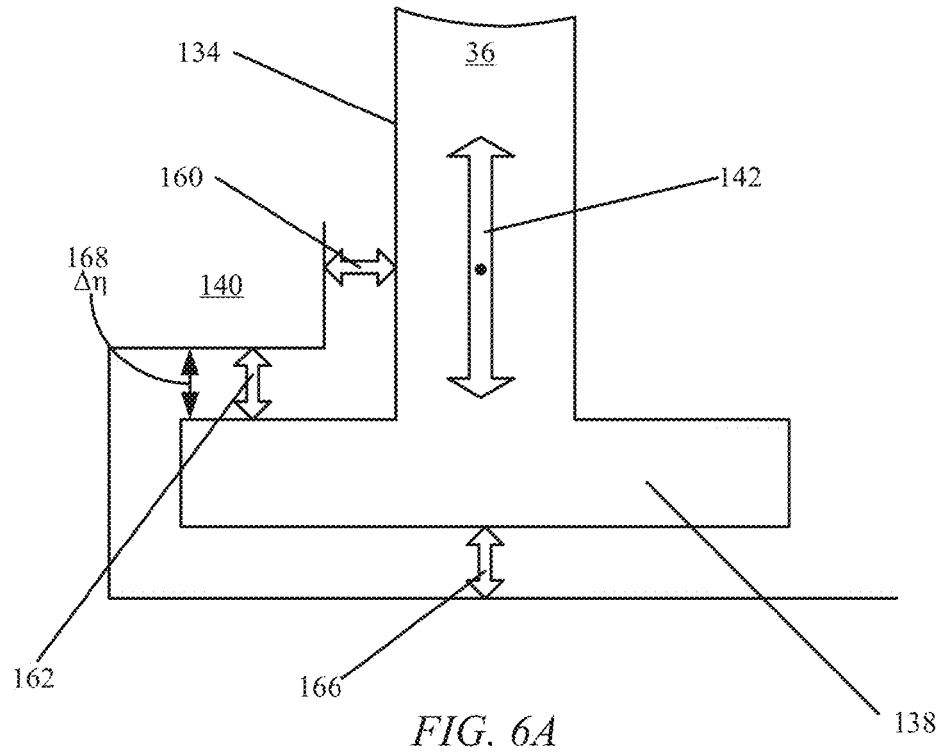
FIG. 6A shows a side view of an impeller shaft mounted within a thrust bearing in accordance with the described embodiments.
Figure 6B:
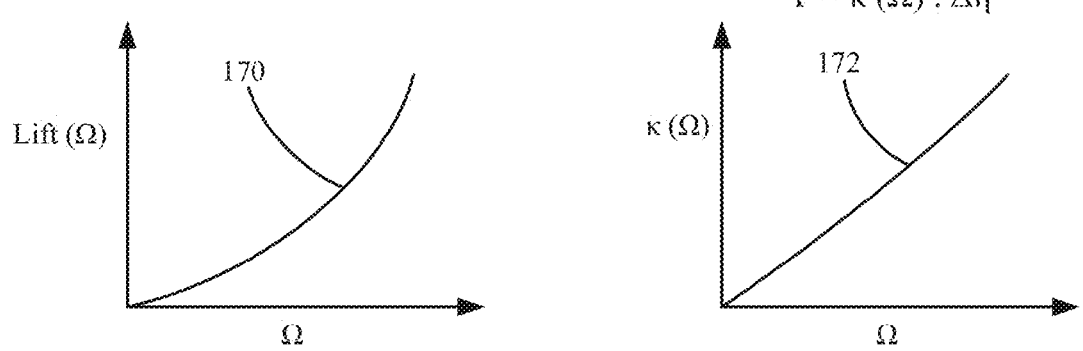
FIG. 6B illustrates impeller and thrust bearing characteristics as a function of the angular velocity in accordance with the described embodiments.

FIG. 6A shows a side view of an impeller shaft 36 mounted within a thrust bearing 140. The force exerted by the fluid in the gap of the thrust bearing can vary from location to location. For instance, the fluid forces 160, 162 and 166 are shown at three different locations. The fluid forces can be referred to as restoring forces when they operate to center a thrust plate and a shaft within a fluid dynamic bearing. The fluid force at each location can depend on parameters such as a gap 168 between shaft 36 and a side of the bearing cavity at that location, the local geometry, such as a local groove pattern (e.g., see FIG. 5), the viscosity of the fluid in the reservoir, and the rotation rate of the shaft 36. The fluid force at each location can be approximately modeled as a spring constant k times the spacing between the shaft 36 and the thrust-bearing cavity at each location.

Using the spring model, the parameters associated with the thrust bearing can be selected to meet particular operation objectives associated with the fan. As an example, as shown in FIG. 6B, the impeller can be configured with blades that generate lift where the lift increases as a function of rotational velocity. The lift can cause the impeller shaft to move upward in the thrust-bearing cavity, which is undesirable. To prevent the movement, the local spring constant associated with the force exerted by the fluid, such as the spring constant associated with force 162, can be tuned such that the spring constant increases as the rotational velocity increases as is shown in FIG. 6B. For instance, the local groove geometry on the shaft 36 can be selected to meet this objective. When properly designed, as the rotational velocity increases, the fluid pressure in the thrust bearing increases and results in a "stiffer" bearing. The stiffer bearing can prevent the shaft from rising as a result of the increasing aerodynamic lift generated by the impeller blades.

Figure 6C:
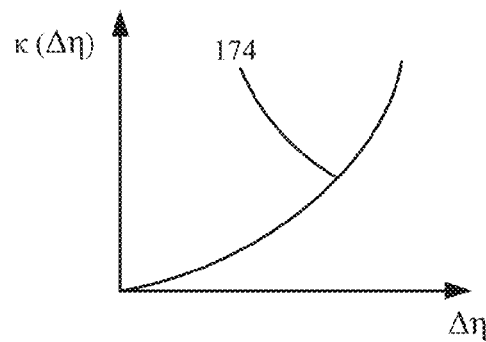
FIG. 6C illustrates impeller and thrust bearing characteristics as a function of gap distance in accordance with the described embodiments.

In one embodiment, a shape of the fluid spring constant curve 172 as a function of rotational velocity can be designed such that it matches or exceeds the shape of the lift curve 170 associated with the impeller blades. Lift and spring constant curves are shown in FIG. 6B. FIG. 6C shows a shape of the fluid dynamic bearing spring constant curve 174 as a function of gap distance, thereby depicting a relationship between stiffness K as a function of gap 168. As depicted by curve 174, stiffness K increases proportionally with a cube of gap 168. Consequently, force exerted on thrust plate 138 increases rapidly as gap 168 changes.

Further, since the total downward force exerted on the shaft 36 can depend on a size of the thrust plate 138, such as its diameter, the size of the thrust plate 138 of the shaft 36 can be selected such that it includes a sufficient surface area to allow the total lift generated by the impeller, which can depend on the size of its blades, to be counteracted by the downward force exerted on the shaft 36 by the fluid in the thrust bearing 140. Furthermore, the diameter, bearing gap, and fluid viscosity, as well as the groove depth, number, width and spiral angle can be selected to achieve the appropriate stiffness and damping characteristics to resist relative motion between the stationary and rotating assemblies when subjected to external loading such as vibration (internal or external) or shock impacts.

Figure 6D:
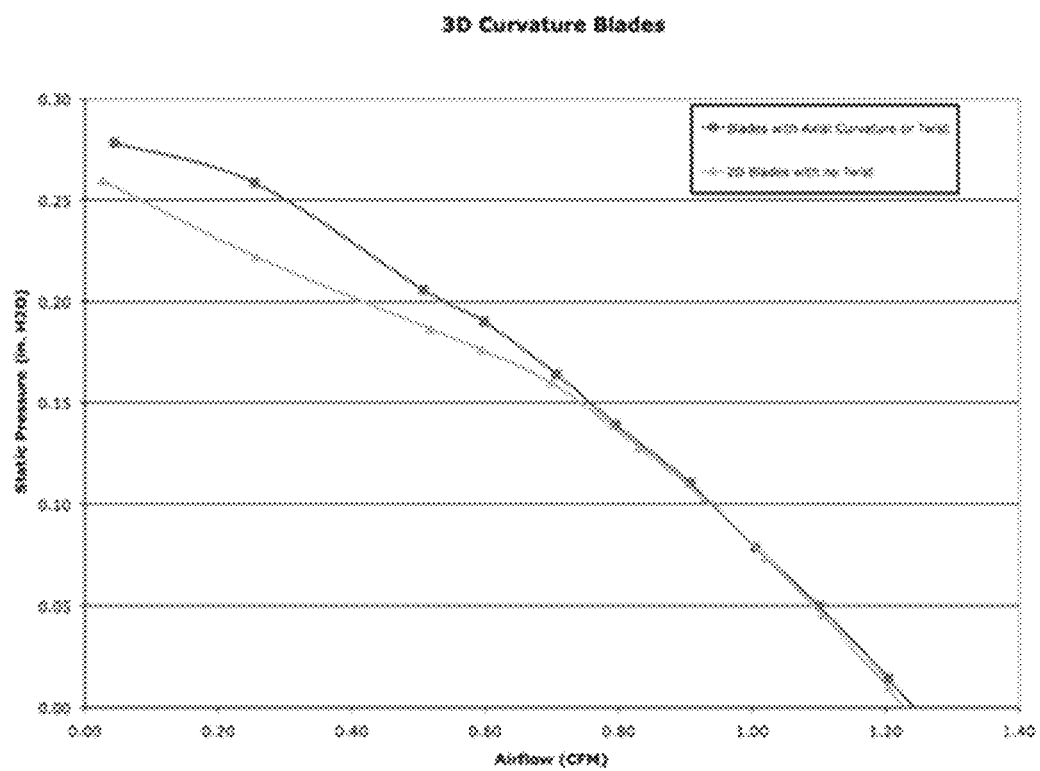
FIG. 6D illustrates a comparison of performance between impeller designs using 2-D blades with constant cross-section and 3-D blades with varying cross-section.

FIG. 6D illustrates a comparison of performance between impeller designs using 2-D and 3-D blades in a fan assembly. Performance curves for 2-D blades and 3-D blades are shown. It can be seen that the static pressure head generated for the 3-D blades that include twist is improved for a range of airflows. Thus, the overall efficiency of the fan assembly using the 3-D blades is increased. Typically, in a 3-D blade design, it can be desirable to move the 3-D performance curve up and to the right as compared to the baseline performance curve, such as the 2-D blade design.

In general, the baseline performance curve may be a performance curve for a particular fan design with a particular blade geometry that can be 2-D or 3-D, a particular impeller geometry, a particular housing geometry and particular power requirements. The particular fan design can be the initial design at the beginning of the design process. A design objective for a new fan design can be to improve some attribute of the initial design while maintaining or improving upon the fan performance over a desired operational range of the fan. For instance, it may be a design objective to reduce a height of the fan assembly, the diameter of the impeller or the power used by the fan while maintaining the airflow rate versus pressure performance over some airflow rate range. Another example of a design objective can be maintaining an acoustic profile of a fan while increasing airflow throughput.

During a design process, factors such as the blade geometry, operational velocity range, impeller geometry, thrust bearing design and fan assembly housing can be adjusted to meet the design objectives. As is shown in FIG. 6D, performance curves can be compared for different designs to determine if design objectives have been met. For instance, as is seen in FIG. 6D, the 3-D blade design results in improved performance of the fan assembly over a range of airflows as compared to the 2-D blade design. Other types of performance curves can be used to assess whether a design objective has been met and the example of static pressure versus airflow rate is provided for the purposes of illustration only. For instance, a curve of the power consumption versus airflow rate can be used to assess the fan assembly performance.

For a given design improvement, it may not be necessary to improve or maintain the fan performance over the entire range of air flows but over some desired operational range of airflows. Thus, a new design can perform better or the same as an old design over the desired operational range but more poorly outside of the range. In some embodiments, the operational range for a new fan design can be selected to match some region of peak performance exhibited by the device.

Another design consideration when designing a fan is desired audio performance of a computing device, as audio performance can be limited by a tendency of operational modules within the device to vibrate audibly when excited by the speakers. This issue can be addressed by de-rating the equalizer settings to limit the speaker output within a certain frequency range(s) that induces undesirable buzzing noises. Unfortunately, this technique compromises the ultimate audio performance that the speakers would otherwise deliver. The blower or cooling fan tends to be one of the contributors to buzzing noise due to the configuration of conventional axial contact bearing technology that is typically used in the prior art. A spherical shaft tip portion of the shaft that is magnetically preloaded against a plastic thrust pad generally provides this axial contact thrust force. It should be noted that while the discussed embodiments relate to vibrations emanating from a speaker system, other vibrations such as those created by spinning media readers and actuation of user input buttons can also cause vibrations that can be mitigated by the below described embodiments.

When the excitation force transmitted from the speakers exceeds the magnetic preload force holding the shaft against the thrust pad, the shaft tip "bounces" on the thrust pad producing a loud buzzing noise. Increasing the magnetic preload force has made improvements, but the performance is still quite marginal and will therefore continue to limit audio performance in computing devices. Fluid dynamic thrust-bearing (FDB) technology can be introduced to eliminate this buzzing issue altogether.

FDB-type axial thrust bearing technology limits the impeller axial motion to about 1/10th of its current range associated with conventional contact thrust bearing technology and introduces strong oil film damping to eliminate thrust contact and the related buzzing noise. For example, an impeller supported by a conventional magnetically-preloaded contact thrust bearing can have a range of about 400-500 microns of axial motion in designs that include a lock ring to limit shock displacement. Many designs omit the use of a lock ring, in which case the axial motion is even larger as it is limited by clearances between the impeller blades and the fan or blower housing. A cooling fan with FDB thrust bearing technology can have a range of about 10-30 microns of axial motion since that is a typical axial gap defining a grooved fluid dynamic thrust bearing. It should be noted that the range could be adjusted to optimize an amount of stiffness in the bearing.

Figure 7A:
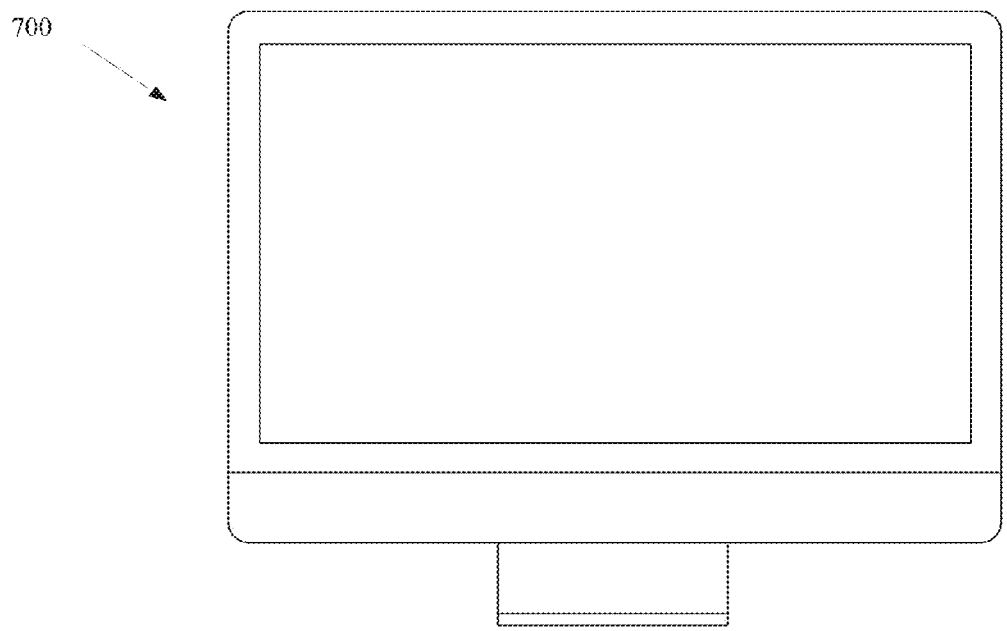
FIGS. 7A and 7B show an all-in-one desktop computing device in which all of the primary operational components are disposed in a single housing.
Figure 7B:
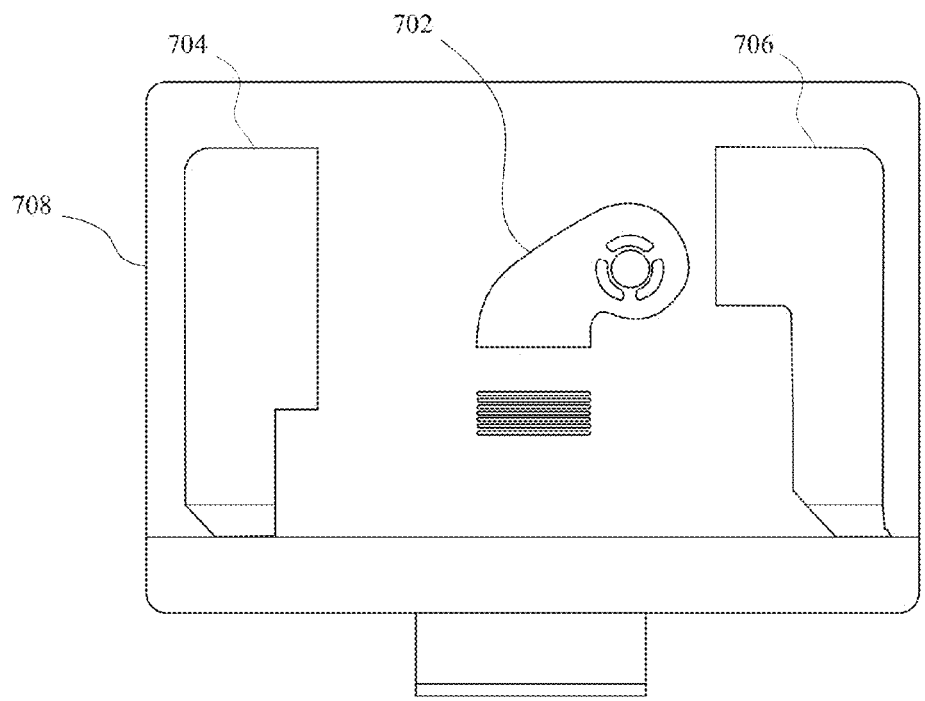

FIGS. 7A and 7B show an all-in-one desktop computing device 700 in which all of the primary operational components are disposed in a single housing. Device 700 is one embodiment that can benefit from an addition of thrust bearing technology. The iMac® computer produced by Apple Inc. of Cupertino, Calif. is one example of such a device. FIG. 7B is the same device 700 as depicted in FIG. 7A, but with the display and several other modules removed in order to reveal a placement of blower assembly 702 (or centrifugal blower in this case) and speakers 704 and 706. The speakers 704 and 706 are oriented to fit within slim computer housing 708. The blower is oriented with its bearing axis perpendicular to the display. This results in speaker-induced vibration exciting slim computer housing 708, thereby exciting the blower's bearing system in a direction perpendicular to the display. Such a configuration is especially undesirable when the speaker-induced vibrations cause a housing of blower assembly 702 to vibrate at a resonant frequency.

Figure 8A:
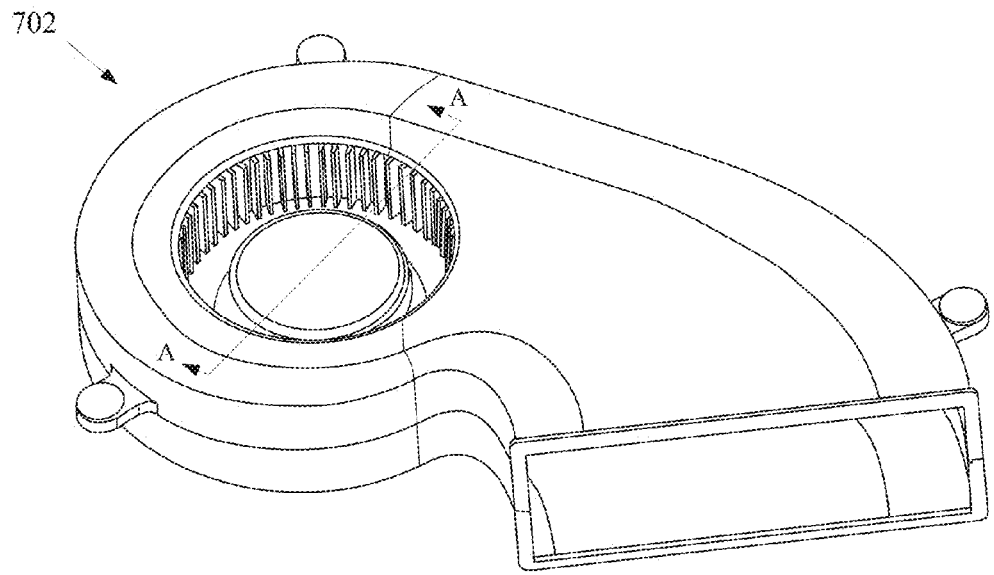
FIG. 8A shows a perspective view of a blower assembly.
Figure 8B:
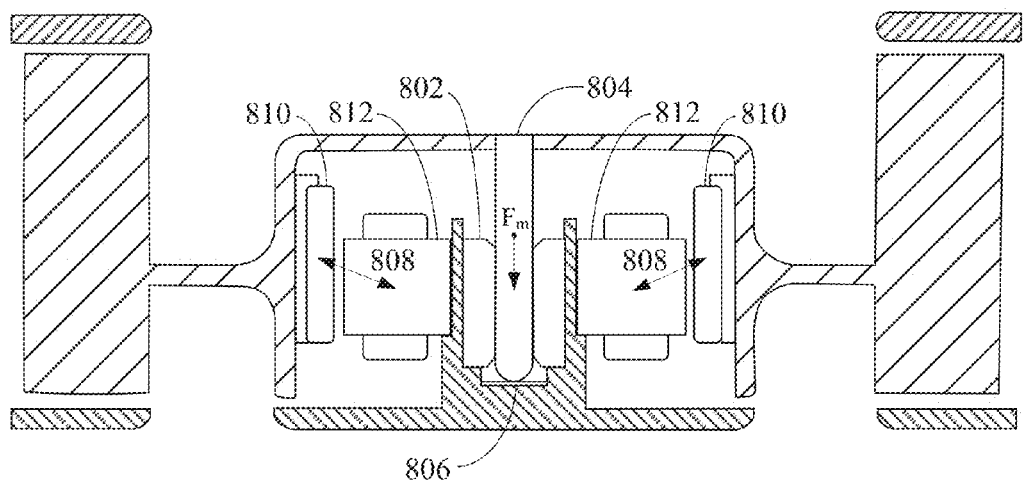
FIG. 8B shows a cross-sectional view of a blower assembly.

FIG. 8A shows an isometric view of an inlet side of blower assembly 702. A side cross-sectional view of blower assembly 702 in accordance with section line A-A from FIG. 8A is shown in FIG. 8B. The bearing and motor represented in FIG. 8B are examples of the prior art contact thrust bearing.

FIG. 8B is a planar cross-sectional view of blower assembly 702 showing a rotational fan assembly that includes both motor and bearing structures. A sintered sleeve journal bearing or a grooved fluid dynamic journal bearing provides radial stiffness of the bearing and is shown in the figure as 802. In both cases, shaft 804 rides on a film of oil that provides significant damping and stiffness in the radial direction. The axial stiffness is provided by the contact between a spherical shaft tip portion of shaft 804 and thrust pad 806, which results in very high stiffness in one direction, very low stiffness in the opposite direction, and little damping due to the two parts being in physical contact. The shaft is maintained in contact with thrust pad 806 by an axial component of magnetic attraction force 808 resulting from attraction between magnet 810 and stator core 812. In this case, axial force $F_M$ is created by offsetting a center of magnet 810 above a center of stator core 812, resulting in a net downward attraction force $F_M$. In one embodiment, stator core 812 can be a steel core wound with copper. Other means of developing this force are commonly used, such as addition of secondary magnet subassemblies and/or addition of separate attraction rings placed proximate magnet 810.

The method of offsetting magnet 810 vs. stator core 812 tends to have acoustic performance disadvantages due to oscillating axial forces at pole-passing frequencies caused by interaction of magnet 810 and stator core 812. As $F_M$ is increased to compensate for system vibrations described above, the oscillating axial forces get progressively worse. One common means of preventing the oscillating axial forces is to provide a secondary magnet and attraction yoke (not shown) to create the axial force. While this can alleviate the acoustic performance issue, it comes at the cost of adding additional components to the assembly. The audio performance limitation then becomes a tradeoff between how strong of a force $F_M$ can be achieved and the associated cost, complexity and undesired acoustic motor noise.

Figure 8C:
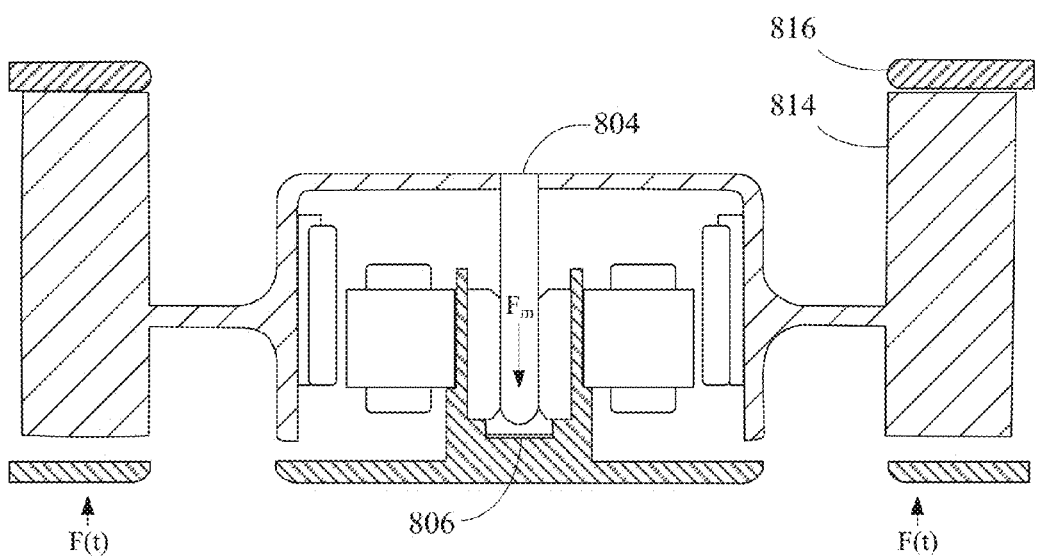
FIG. 8C shows a cross-sectional view of a blower assembly being acted upon by a vibratory force F(t).

FIG. 8C shows how speaker-induced vibration force F(t) can act on the blower housing transmitted through its mounting points in computing device 700 (not shown). This vibration force F(t) can exceed $F_M$ in cases where the computer system is designed to have high audio output, especially at low frequencies. During the time in which $F(t)>F_M$, the shaft will lift off of thrust pad 806 as shown in FIG. 8C. In some cases, a top portion of fan blades 814 can even impact fan housing 816, causing even more undesirable noise. When the condition returns to $F(t)<F_M$, shaft 804 impacts against thrust pad 806 and the impacts can result in an undesirable "buzzing noise" heard by a user of computing device 700.

It is desirable to provide a bearing system that does not require an axial preload force $F_M$, which tends to cause acoustics tones associated with the motor operation. It is also desirable to employ an axial bearing that has all the motion-damping benefits associated with the fluid journal bearing to attenuate the buzzing noise associated with the current spherical contact thrust bearing technology.

Figure 9A:
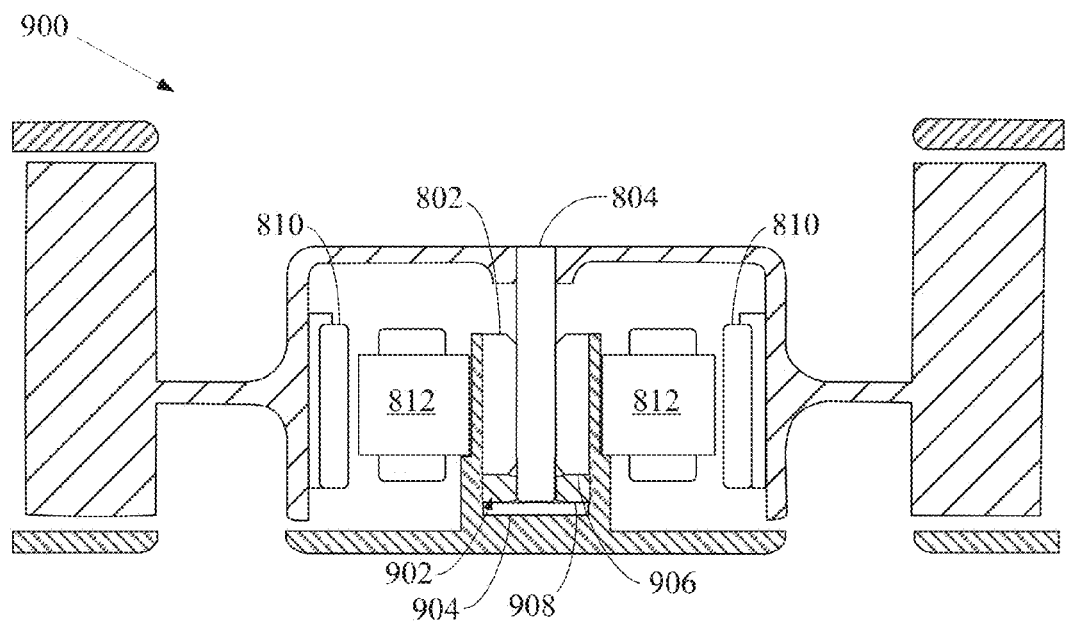
FIG. 9A shows a blower assembly having shaft with a thrust ring.

FIG. 9A shows a one-side cross-sectional view of blower 900 similar to blower assembly 702, but the magnetically-preloaded spherical shaft tip has been replaced with a grooved fluid dynamic dual-thrust bearing system in the form of thrust ring 902 pressed on to one end of shaft 804 and captured between bearing sleeve 802 and "counter-thrust" plate 904. Thrust ring 902 gives a flange shaped geometry to an end of shaft 804. Upper thrust bearing 906 and lower thrust bearing 908 both include shallow spiral grooves located on either of the opposing faces of the thrust ring, bearing sleeve, and/or counter-thrust plate. The grooves act to make the thrust bearing "dynamic", such that the pressure developed in the lubricating fluid increases steeply and instantaneously when the gap is reduced. This effectively provides axial stiffness and axial damping to counter relative motion between the stationary and rotating parts of the blower. The relative axial motion is reduced to about $1/10^{th}$ of that associated with the embodiments depicted in FIGS. 8A-8C, and contact between the stationary and rotating parts is effectively prevented. It should be noted that in this embodiment the axial offset between magnet 810 and stator core 812 is nominally zero to eliminate acoustics artifacts, since the dual-thrust bearings do not require a magnetic preload. This also eliminates the need for a secondary magnet attraction system and its associated cost and complexity.

Figure 9B:
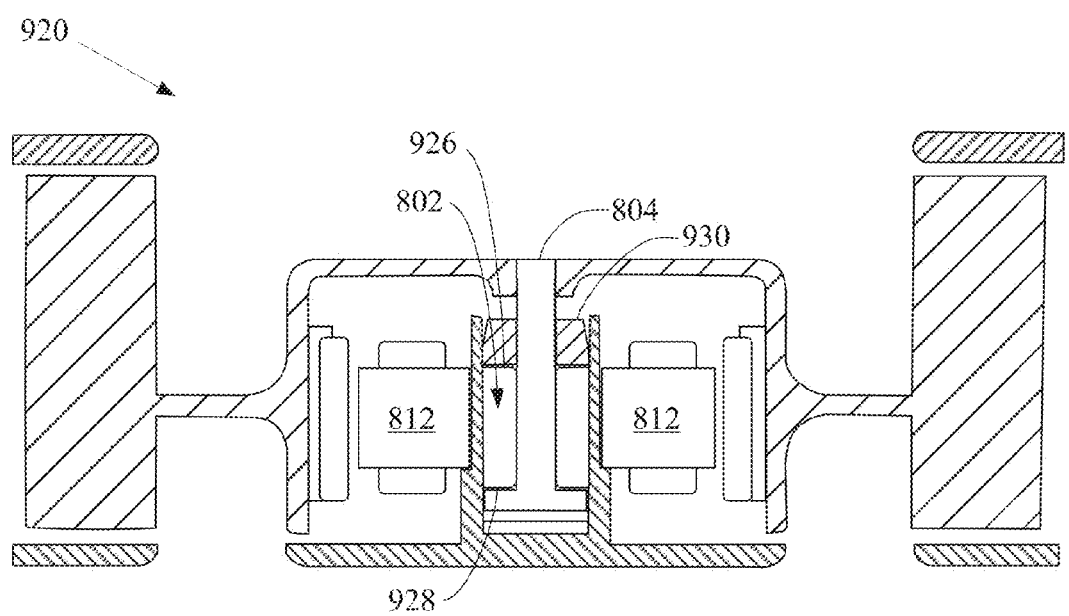
FIG. 9B shows a blower assembly having a shaft with a T-shaped end.

FIG. 9B below shows an alternative configuration blower 920 for design with two fluid dynamic bearings (FDB): upper thrust bearing 926, above bearing sleeve 802 and lower thrust bearing 928 below it. Lower thrust bearing 928 can be integrated into shaft 804 by incorporating a T-shape formed at the end of it. Alternatively, the T-shape can be achieved by using a pressed-on ring or a part that is screwed into a bottom end of shaft 804. Upper thrust bearing 926 is located along a bottom surface of an additional ring 930 pressed onto shaft 804 above bearing sleeve 802. This creates a different configuration that achieves the same goal of providing two FDB thrust bearings that axially oppose each other to limit relative motion of the impeller with respect to the stationary assembly. In this way, the risk of buzzing noise and the need for a magnetic preload can be eliminated.

Figure 9C:
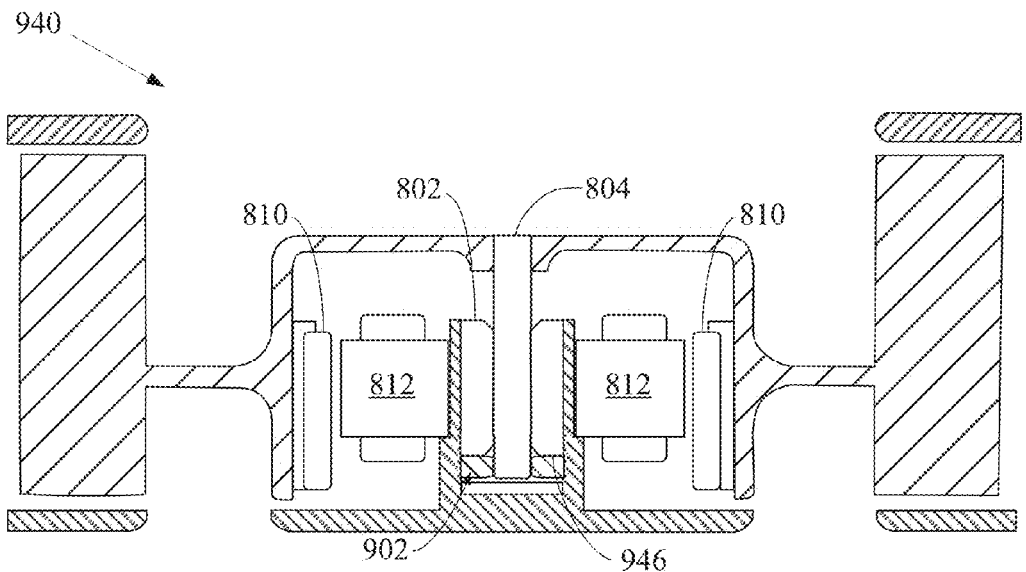
FIGS. 9C-9D show various blower assembly configurations with a magnetically preloaded single fluid dynamic bearing.
Figure 9D:
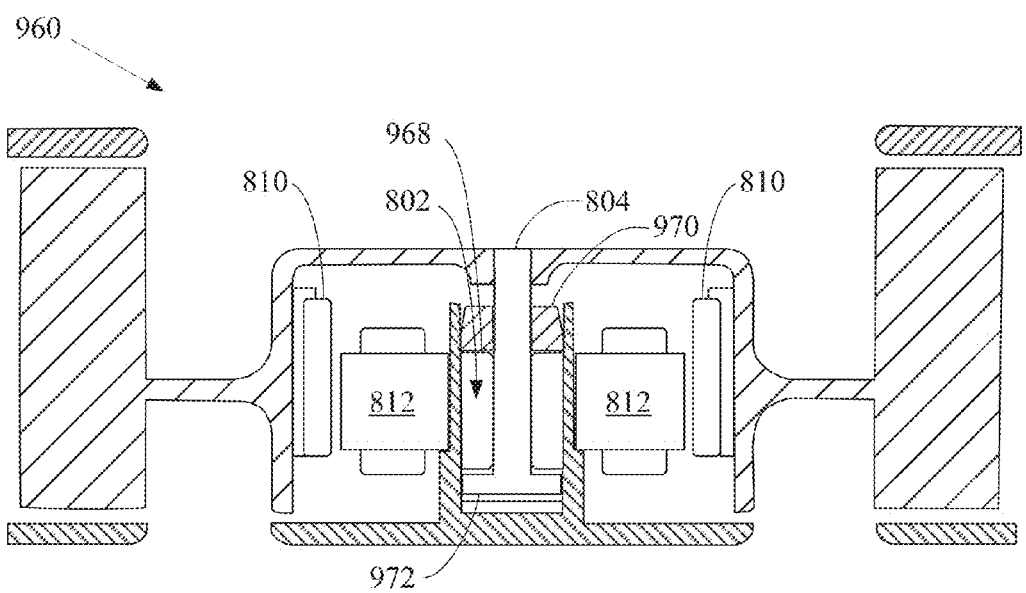

There are also benefits to using a magnetically preloaded single grooved FDB thrust bearing along with a means for limiting shock displacement (i.e. an underlapping shoulder in the bearing structure). The single FDB thrust bearing has significant damping advantages over the prior art spherical contact thrust bearing. FIGS. 9C-9D depict magnetically preloaded single grooved FDB thrust bearings. In FIG. 9C, an alternative configuration blower 940, a magnetic force caused by an offset between magnets 810 and stator cores 812 places an upward axial force on the impeller, while thrust ring 902 and fluid dynamic thrust bearing 946 retain shaft 804 within bearing sleeve 802 by countering the magnetic force. FIG. 9D shows an alternative configuration blower 960 having a single grooved FDB that has an offset opposite to the offset of blower 940, configured to apply an axial magnetic force oriented in a downward direction to the impeller, while thrust ring 970 and fluid bearing 968 retain shaft 804 within bearing sleeve 802. In some embodiments, as depicted in FIG. 9D, shaft 804 can include a non-grooved flanged end 972 operative as an axial displacement limiter. By mechanically preventing excessive axial displacement of the impeller, the impeller can be prevented from being displaced out of the sleeve bearing (as in FIG. 8C), when an external force overcomes the magnetic preload that retains the impeller within the sleeve bearing.

There are multiple ways to implement the above invention in addition to the configurations described in FIGS. 9A-9B. Also, the specific details of the bearing design (including parameters like groove shape, groove depth, lubricant circulation paths, sealing means, bearing gaps, bearing diameters, etc.) are well known to one skilled in the art and should not be considered limitations to the scope of this invention. It should be noted the described thrust bearing embodiments could be utilized with a mixed flow fan, an axial fan or a centrifugal fan. Furthermore, the configurations described in FIGS. 9A-9D each allow a speaker system to be driven in an uninhibited manner without causing unwanted audio responses to be generated from the blower assembly. In this way, audio performance of an associated computing device can be substantially improved.

The various aspects, embodiments, implementations or features of the described embodiments can be used separately or in any combination. The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

While the embodiments have been described in terms of several particular embodiments, there are alterations, permutations, and equivalents, which fall within the scope of these general concepts. It should also be noted that there are many alternative ways of implementing the methods and apparatuses of the present embodiments. It is therefore intended that the following appended claims be interpreted as including all such alterations, permutations, and equivalents as fall within the true spirit and scope of the described embodiments.

What is claimed is:

1. A blower assembly suitable for operation in proximity to a vibration source, the blower assembly comprising:
    a housing including an inlet for receiving air and an outlet for expelling the air; and
    a rotational fan assembly, comprising:
        an impeller having a plurality of fan blades,
        a shaft having a first end coupled to a central portion of the impeller,
        a sleeve surrounding at least a portion of the shaft,
        a thrust ring surrounding the shaft and located between the first end of the shaft and a first end of the sleeve, wherein the thrust ring is spaced apart from where the first end of the shaft couples to the central portion of the impeller, and a dual-thrust bearing comprising a first grooved fluid dynamic bearing at located where the first end of the sleeve abuts the thrust ring, and a second grooved fluid dynamic bearing at a second end of the sleeve opposite the first end and acting in an axial direction opposite an axial direction of the first grooved fluid dynamic bearing, wherein the dual-thrust bearing is configured to limit relative axial motion between the impeller and the housing during operation of the rotational fan assembly.

2. The blower assembly as recited in claim 1, further comprising a thrust plate disposed at a second end of the shaft, wherein the thrust plate is surround by a fluid.

3. The blower assembly as recited in claim 1, wherein the blower assembly is a centrifugal flow fan configured to exhaust air directed in a substantially centrifugal direction.

4. The blower assembly of claim 1, wherein the impeller includes a central hub with a hollow portion and wherein the thrust bearing is disposed within the central hub such that it is at least partially surrounded by the central hub.

5. A fan assembly configured to operate in proximity to a vibration source, the fan assembly comprising:
a housing including an inlet for receiving air and an outlet for expelling the air;
an impeller mounted within the housing and configured to rotate around an axis, the impeller including a shaft extending from a central portion of the impeller;
a sleeve surrounding the shaft;
a thrust ring surrounding the shaft between the sleeve and where the shaft extends from the central portion of the impeller; and
an axial control mechanism comprising a first grooved fluid dynamic bearing at a first end of the sleeve and a second grooved fluid dynamic bearing at a second end of the sleeve acting in an axial direction opposite an axial direction of the first grooved fluid dynamic bearing, wherein the first grooved fluid dynamic bearing includes a first spiral groove and the second grooved fluid dynamic bearing includes a second spiral groove, wherein during an operation of the impeller, the first spiral groove and the second spiral groove combine to increase a pressure of a fluid in the first spiral groove and the second spiral groove to limit relative axial motion between the impeller and the housing.

6. The fan assembly as recited in claim 5, wherein the vibration source is a speaker system, and wherein the axial control mechanism is configured to axially stabilize the impeller throughout an output range of the speaker system.

7. A computing device fan, comprising:
a housing;
a shaft located within the housing;
an impeller having a plurality of impeller blades secured to the shaft;
a sleeve surrounding at least a portion of the shaft;
a first ring surrounding the shaft proximate a first end of the sleeve, the first ring being separate from the shaft and the sleeve;
a first thrust bearing disposed at the first end of the sleeve and including a first groove; and
a second thrust bearing disposed at a second end of the sleeve opposite the first end and including a second groove, wherein during operation of the impeller the first groove and the second groove combine to increase a pressure of a fluid in the first thrust bearing and the second thrust bearing, the pressure countering an axial force of the impeller relative to the housing.

8. The computing device fan of claim 7, further comprising a second ring disposed at an end of the shaft and proximate the second end of the sleeve, the second ring being separate from the shaft and the sleeve, wherein the second thrust bearing is disposed at a surface of the second ring.

9. The computing device fan of claim 8, wherein the second groove is disposed on the surface of the second ring.

10. The computing device fan of claim 7, further comprising a flange integrally formed at an end of the shaft and proximate the second end of the sleeve, wherein the second thrust bearing is disposed at a surface of the flange.

11. The computing device fan of claim 10, wherein the second groove is disposed on the surface of the flange.

12. The computing device fan of claim 7, further including at least one magnet and at least one stator core component that together drive the operation of the impeller and create the axial force thereby, wherein the pressure counters the axial force without requiring any magnetic preloaded force.

13. The computing device fan of claim 7, wherein the first ring is pressed onto the shaft.

* * * * *